March 14, 1961 V. G. AMES 2,974,943
SHOCK MOUNT
Filed Feb. 17, 1960
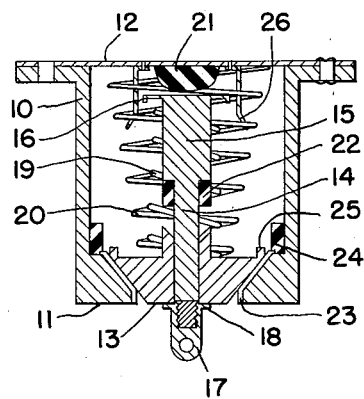
INVENTOR.
VERNON G. AMES
BY
*S. J. Rotondi, A. J. Dupont & S. Lubroff*
ATTORNEYS:

United States Patent Office 2,974,943
Patented Mar. 14, 1961

2,974,943
SHOCK MOUNT

Vernon G. Ames, Langhorne, Pa., assignor to the United States of America as represented by the Secretary of the Army Filed Feb. 17, 1960, Ser. No. 9,401

7 Claims. (Cl. 267—1)

(Granted under Title 35, U.S. Code (1952), sec. 266)

The invention described herein may be manufactured and used by or for the Government for governmental purposes without the payment to me of any royalty thereon.

This invention relates to a shock absorbing mount construction such as may be needed for example in keeping a telescope on a target and at the same time free from damage from shocks like those which are transmitted from a variety of causes in the mechanism operating or transporting such a telescope. An object is to provide a better mount for absorbing a shock from any direction and provide a precision return to an original position of the cross hairs of a telescope for example.

Preloaded springs have been used for absorbing a shock of push or pull above some predetermined value of force, but so far as is known no prior construction has been capable also of absorbing shocks in any direction and offering a precision return to an original position.

According to this invention a shock absorbing mount has been provided to absorb a shock above some safe predetermined value from any direction and provide an exact return to an original position.

The single figure in the drawing illustrates a preferred embodiment of this invention.

A metal or plastic casing 10 of any convenient shape is provided with a front wall 11 and rear wall 12 between unnumbered side walls, which are usually cylindrical. In the front wall 11 normally closing a central opening is a conical member 13 having tapered walls preferably forming an angle of approximately 45° to the front wall 11. A rod 14 is slidable axially through said conical member under an excessive pull applied to it. The upper portion 15 of rod 14 is enlarged and provided with a radial outward flange 16 as illustrated. Between flange 16 and conical member 13 is spring 19 which is normally held preloaded under compression to some predetermined axial length. When a pull of a size beyond that under which the spring 19 is normally loaded is applied to the forward or outer end 17 of rod 14, this rod is slidable through member 13 until balanced by spring 19 or until a buffer 22 of rubber or other suitable material engages a central rearwardly extending portion of member 13. As shown, the end of the rearwardly extending portion of member 13 is shaped to cause a radially outer portion of buffer 22 to be compressed more than is its radially inner portion contiguous to the rod 14 so that there is a tendency for the buffer material to flow radially inwardly rather than radially outwardly where there would be a greater danger of the material ever getting a permanent set. Also there is a damping or snubbing action from friction due to the rubber or other material being forced against the rod 14 thus further restricting axial motion. The buffers 21, 22 and 24 are provided to prevent excessive movement of the rod 14 and conical member 13 as well as prevent metal-to-metal impacts which might damage the equipment being shock mounted. Said buffers also increase the shock absorbing capacity of the shock mount by virtue of their damping characteristics and non-linear spring constant. Approximately equal clearances are provided between the movable members 13 and 15 and their respective buffers. This clearance is for the purpose of and of such dimension to permit maximum movement of members 15 and 14 before buffer contact, consistent with compact shock mount design, without utilizing excessively non-linear buffer designs or materials.

When applying a push to the adapter 17 a flange 18 transmits load to the conical member 13 and when this rearward thrust exceeds some given preload value the outer spring 20 is further compressed until the rear end of rod 14 engages the buffer 21 to absorb this excess thrust and limit rearward movement of the member 13 and compression of spring 20. Normally with member 13 closing the opening in front wall 11 both springs are preloaded substantially equal amounts. This means that any push or pull applied to adapter 17 in excess of the amount to which the springs 19 or 20 are preloaded will effect axial movement of the rod 14 and adapter 17 with respect to the casing 10. For example an inward thrust on adapter 17 must first overcome the preloaded force in spring 20 before added load with further compression of spring 20 and movement of member 13 with respect to casing 10 takes place. Conversely an outward pull on adapter 17 must first overcome the preload in spring 19 before relative outward movement of rod 14 with further compression in spring 19 occurs.

In case a lateral force is applied to adapter 17 at say 90° to the axis of rod 14 and member 13 then the lateral component of the preload on member 13 must be overcome before movement of member 13 occurs. Such a force must also overcome friction between conical member 13 and the tapered surface of the wall of the perforation in the front wall against which the member 13 contacts, before movement may be expected. Also a lateral thrust may be resolved into components inward and along the surface of the tapered wall. The degree of the slope will control the value of the component of force along the inclined surface. Therefore the degree of this slope is an important factor in determining the value of a lateral thrust that must be overcome before movement of member 13, up the inclined surface may be expected. The friction coefficient of the inclined and conical surface is also important. To reduce the expense of striving to have a metal or other surface provide a predetermined degree of friction it has been found that coating one or both of these inclined or tapered surfaces with some appropriate material, is a simpler and easier way of imparting the desired degree of friction to them. A layer of a fairly smooth yet yieldable plastic such as Teflon 23 was found appropriate to reduce the friction of metal on metal. Such a layer is shown as applied to only the tapered wall of the opening in the wall 11 but such a coating may also be applied to the tapered wall of cone member 13 depending on the results desired. In event lateral component of a thrust is sufficient to cause cone member 13 to slide up the Teflon surface, then to limit the degree of such movement a rubber cylindrical buffer 24 is installed as shown. To further limit the degree of such movement the rear edge of cone member 13 is provided with a rear projection 25; consequently, the upstanding radially outer surface of projection 25 will not cut into buffer as an edge of cone member 13 might do were projection 24 absent. In event a lateral thrust may effect a rotation of conical member 13, about an axis perpendicular to the rod 14 and within the conical member 13 rather than force member 13 to tilt moving nearly laterally up the inclined surface, the cup 26 is provided to prevent said rotation. Said rotation is prevented by virtue of the restraining action of the cup 26 on the outer diameter of the flange 16, thus preventing a large (in regard to the lateral motion of adapter 17) lateral motion of the flange 16 that would occur if the rod 14 were to so rotate about said axis. The upper convolutions of spring 20 are outside of cup 26.

I claim:

1. In a shock absorbing connection capable of absorbing shocks above safe predetermined value comprising preloaded springs, a preloading in either spring being overcome before any relative movement of component parts is experienced, the combination therewith of the improvement for absorbing a shock in any direction above some value with reduced danger of damage to whatever is carried by said connection, said improvement including a casing in which are said preloaded springs, a thrust rod within said casing, said casing having a front wall provided with a perforation therein, a conical member in said perforation with the walls of said perforation tapered according to the taper of said conical member and said perforation walls being lined with friction reducing material, seats for said springs on said casing, said thrust rod, and said conical member whereby any lateral component of thrust will be absorbed by at least one of said springs when in excess of said value and will cause said conical member to move up an incline formed by the walls of said perforation.

2. A connection according to claim 1 in which two yieldable buffer members are provided for the load supporting thrust rod which moves toward engagement with one of said buffers irrespective of its direction.

3. A connection according to claim 1 in which said conical member and side walls of said conical member and side walls of said perforation form an angle to the front wall of said casing which is about 45°.

4. A connection according to claim 3 in which a yieldable buffer member is placed around said perforation at the top of the incline up which the conical member may climb under a lateral component of thrust from any direction.

5. A connection according to claim 1 in which said springs are coaxial and one of them within the other.

6. A connection according to claim 5 in which each of said springs is prestressed in compression.

7. A connection according to claim 5 that the springs preferably be formed and selected so that the spring constant (K) for the shock mount as a whole with prescribed load be equal in each of the three mutually perpendicular axes (one in a vertical plane and two in the horizontal plane).

References Cited in the file of this patent
UNITED STATES PATENTS

| | | |
|---|---|---|
| 1,366,422 | Seymour | Jan. 25, 1921 |
| 2,365,842 | Rosenzweig | Dec. 26, 1944 |
| 2,402,400 | Hewitt et al. | June 18, 1946 |